United States Patent [19]
Keller et al.

[11] Patent Number: 4,610,712
[45] Date of Patent: Sep. 9, 1986

[54] APPARATUS FOR MONITORING THE CLOSING ACTION OF A MOULD OF A GLASSWARE FORMING MACHINE

[75] Inventors: René Keller, Zurich; Steven G. Merz, Thalwil, both of Switzerland

[73] Assignee: Emhart Industries, Inc., Farmington, Conn.

[21] Appl. No.: 842,751

[22] Filed: Mar. 21, 1986

Related U.S. Application Data

[63] Continuation of Ser. No. 666,079, Oct. 29, 1984, abandoned.

[30] Foreign Application Priority Data

Nov. 11, 1983 [GB] United Kingdom ................ 8330186

[51] Int. Cl.[4] .............................................. C03B 9/40
[52] U.S. Cl. ........................................ 65/158; 65/29; 65/159; 65/160; 65/163
[58] Field of Search ................... 65/29, 158, 159, 160, 65/163

[56] References Cited

U.S. PATENT DOCUMENTS 4,266,961 5/1981 Wood ...................................... 65/29
4,367,087 1/1983 Cardenas-Franco ................... 65/29

FOREIGN PATENT DOCUMENTS

82/02878 9/1928 European Pat. Off. .............. 65/158

Primary Examiner—Arthur Kellogg
Attorney, Agent, or Firm—Arthur B. Moore

[57] ABSTRACT

In the closing action of the mould, pulses are produced which represent the movement of a mould portion in the closing action. The number of pulses produced between a fixed position and the mould closed position is counted and compared with the greatest number of pulses previously counted for the corresponding movement. If the two numbers differ by a predetermined number, a stop signal is produced which presents further closing actions of the mould.

12 Claims, 3 Drawing Figures

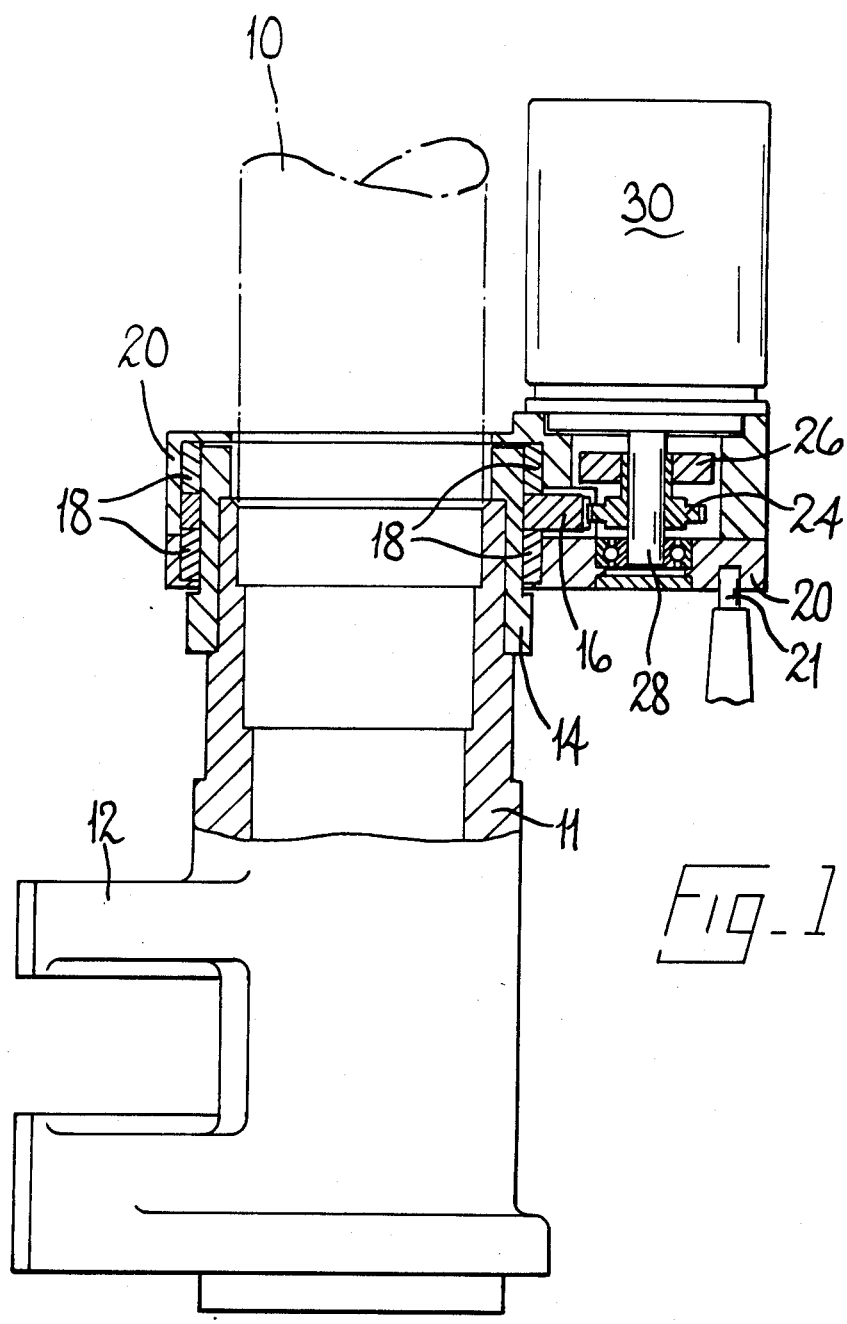
Fig_1

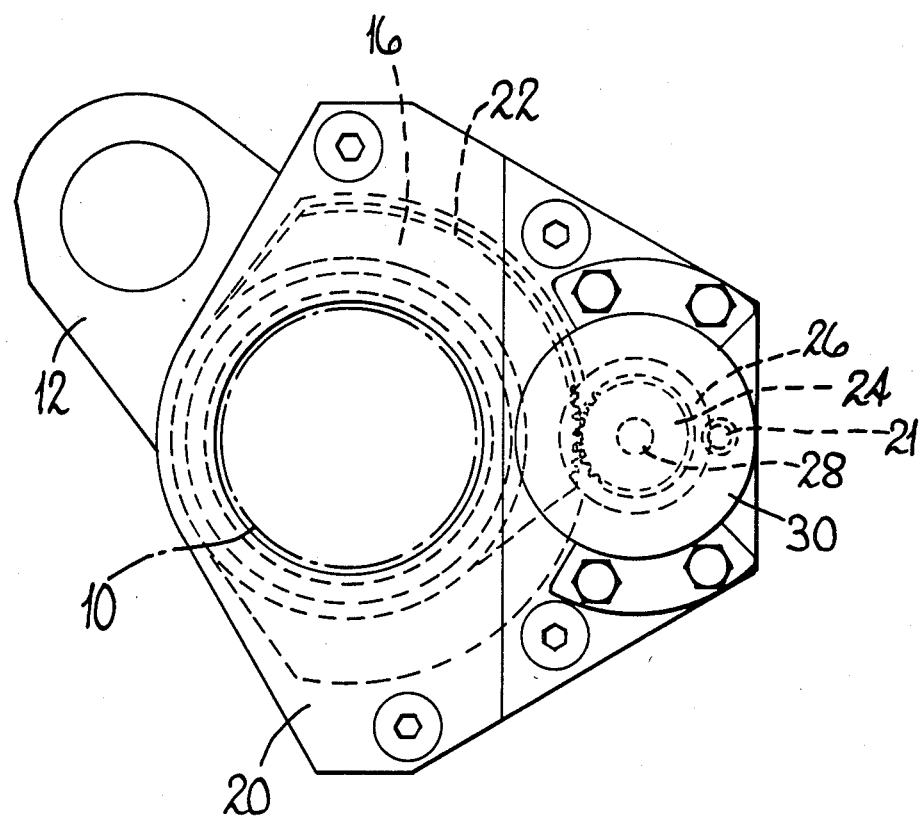

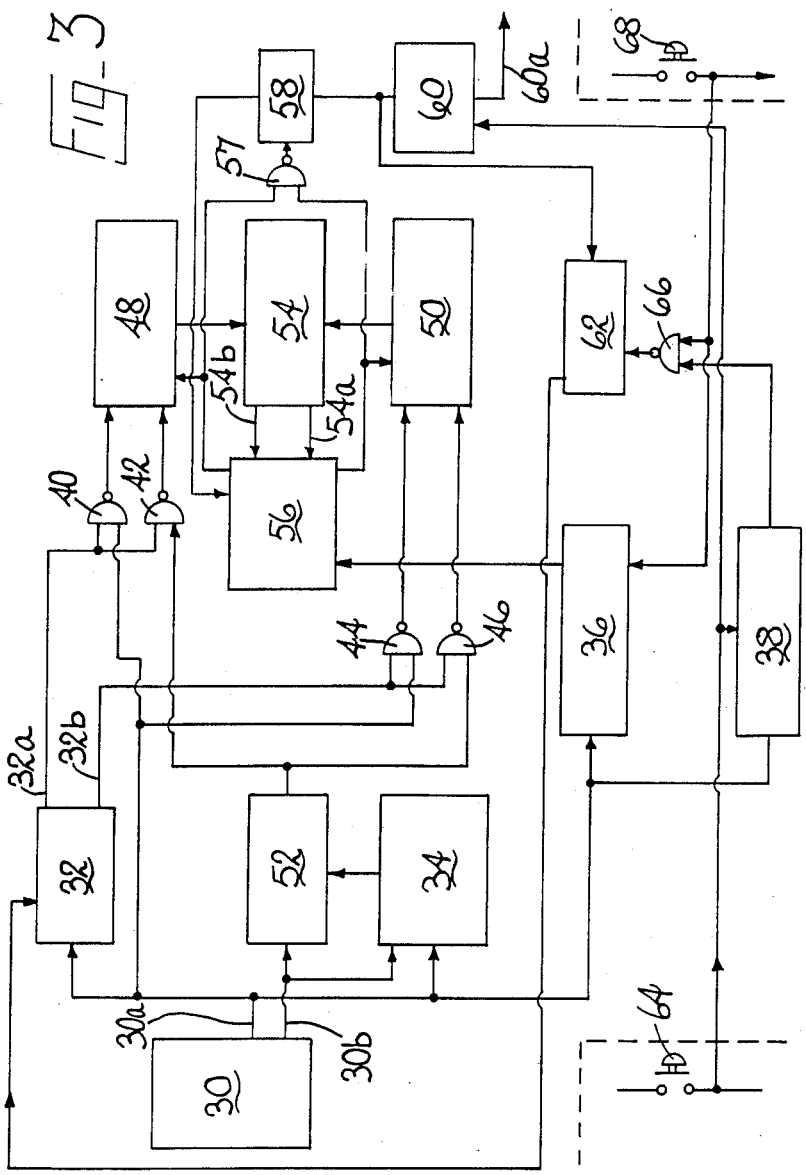

APPARATUS FOR MONITORING THE CLOSING ACTION OF A MOULD OF A GLASSWARE FORMING MACHINE

This is a continuation of co-pending application Ser. No. 666,079 filed on Oct. 29, 1984, now abandoned.

BACKGROUND OF THE INVENTION

This invention is concerned with an apparatus for use in monitoring the closing action of a mould of a glassware forming machine in a cyclic process of forming glassware.

In the manufacture of glassware by the conventional process using an individual section machine, a gob of molten glass is first formed into a parison by either pressing or blowing in a blank (or parison-forming) mould at one station of the machine. Subsequently, the parison is blown into the final shape of the desired article of glassware in a blow mould at another station of the machine as a result of the application of air under pressure to the inside of the parison. Both these moulds are formed from mould portions which are separated to permit removal of a parison or article of glassware and are brought together again into a closed position of the mould for the formation of the next parison or article.

In this process, difficulties arise from time to time due to breakage of a parison in the blank mould and/or breakage of a parison or an article of glassware in the blow mould. When there is a breakage of either the parison or the article as aforesaid, a residue of broken glass (known as "cullet") may be left in the mould and the cullet can prevent formation of a satisfactory parison or article of glassware in the succeeding cycle of operation of the machine by preventing correct closure of the mould. Unless the presence of such cullet in either the blank mould or the blow mould is quickly detected by the operator of the machine and appropriate action taken to prevent several further cycles of the machine taking place, the presence of the cooled, and therefore hard, cullet in the mould can lead to serious damage to either of the moulds when their closing mechanisms, which generate very considerable forces, attempt to close the moulds. The result is that the machine may be put out of operation for a considerable period until replacement of the damaged mould can be undertaken. There is thus a loss of manufacturing time while the moulds are replaced and the replacement moulds are brought up to the correct working temperature.

It is desirable therefore to provide some means by which the malfunction leading to breakage in formation of cullet impeding the closing of either the blank mould or the blow mould is immediately detected and action taken to prevent more than one further cycle of operation taking place in at least that mould where the malfunction has occurred.

In European Patent Specification No. 59576, there is described a method and apparatus of monitoring the closing action of a mould in which a signal representative of the position of a part of the mould at the time when the mould should be closed is compared with a signal representative of the correct closed position of the mould. The position which is representative of the correct closed position of the mould is produced by averaging a selected number of the immediately preceding signals representative of the position of the part of the mould at the time when the mould should be closed.

While the method and apparatus described in the aforementioned European Patent Specification represents a considerable advance over relying upon an operator of the machine to observe the consequences of a malfunction, the method and apparatus depends on averaging a predetermined number of signals and is hence incapable of detecting a further malfunction occurring on the first cycle of operation of the machine after the machine has been stopped because of a malfunction. Such a further malfunction may occur if the cullet has been incompletely cleared from the mould. Furthermore, the aforementioned method and apparatus requires relatively complex electronic equipment capable of synchronising a position signal with a time signal and storing a large number of successive signals.

It is an object of the present invention to provide an apparatus for use in monitoring the closing action of a mould of a glassware forming machine in which the above mentioned disadvantages are avoided.

BRIEF SUMMARY OF THE INVENTION

The invention provides an apparatus for use in monitoring the closing action of a mould of a glassware forming machine in a cyclic process of forming glassware, the apparatus comprising pulse producing means associated with a portion of the mould which is moved in the closing action of the mould, the pulse producing means being operative to produce a plurality of pulses during the movement of the associated mould portion, the number of pulses being directly proportional to the distance moved by the mould portion, storage means operative to store the number of pulses produced by the pulse producing means as the mould portion is moved from a fixed position to a mould closed position thereof in a closing action of the mould, and also to store a number of pulses equal to the greatest number of pulses produced by the pulse producing means in previous cycles of operation of the machine during the corresponding movement of the mould portion and comparing means operative, in each cycle of operation of the machine after the closing action of the mould, to compare the two numbers stored by the storage means and to produce a stop signal in the event that the numbers differ by more than a predetermined number, the stop signal being effective to prevent further closing actions of the mould.

An apparatus in accordance with the last preceding paragraph compensates for the wear of the mould which tends to increase the number of pulses produced in making the closing action of the mould as time passes. The apparatus described in European Patent Specification No. 59576 also compensates for this wear but the apparatus according to the last preceding paragraph does not require synchronisation of a position signal with a time signal and only requires the storing of two numbers of pulses. Furthermore, the apparatus according to the last preceding paragraph is capable of detecting a further malfunction occurring on the first cycle of operation of the machine after the machine has been stopped because of a malfunction.

For simplicity of operation, the storage means may comprise a first memory arranged to store the number of pulses produced by the pulse producing means in alternate closing actions of the mould and a second memory arranged to store the number of pulses produced in the intervening closing actions of the mould, and the comparing means may be operative, in each cycle of operation of the machine, to produce pulses and to supply them to whichever memory is storing the lower number so that the pulses supplied are added to the number stored in that memory until the number stored in each memory is equal and to produce a stop signal if the number of pulses it produces reaches the predetermined number. The pulse producing means may be operative to produce a position signal when the mould portion associated therewith reaches the aforementioned fixed position in a closing action of the mould, the position signal being effective to disconnect one of the two memories from the pulses produced by the pulse producing means and to connect the other memory thereto.

In order to prevent the aforementioned greatest number of pulses from being lost in the event of a malfunction, the comparing means may be operative, in the event that the numbers differ by more than the predetermined number, to produce an inhibiting signal which is effective to prevent the next position signal from being effective as aforesaid.

In order to enable the apparatus to be re-set, for example for use with a new mould, the apparatus may comprise inhibiting means operative on receipt of an operator-initiated load memory signal to prevent the comparing means from operating for one cycle of operation of the machine.

The pulse producing means may conveniently comprise a photo-electric encoder driven by a shaft which is turned about a longitudinal axis thereof to move the mould portion in a closing action of the mould. Another possibility is to use a device which produces a voltage which varies as the mould portion moves, e.g. a linear potentiometer and connect it to a voltage/frequency converter which will convert an input voltage to a train of pulses.

BRIEF DESCRIPTION OF THE DRAWINGS

There now follows a detailed description, to be read with reference to the accompanying drawings of an apparatus for use in monitoring the closing action of a mould of a glassware forming machine in a cyclic process of forming glassware. It is to be understood that the illustrative apparatus has been selected for description by way of example and not of limitation of the invention.

In the drawings:

FIG. 1 is a vertical cross-sectional view of an encoder of the illustrative apparatus showing it mounted on a portion of a mould closing apparatus of a glassware forming machine;

FIG. 2 is a plan view of the encoder shown in FIG. 1; and

FIG. 3 is a diagrammatic view of the illustrative apparatus.

DETAILED DESCRIPTION OF PREFERRED EMBODIMENT OF THE INVENTION

FIG. 1 shows a shaft 10 of a glassware forming machine of the individual section type in which a cyclic process of forming glassware is carried out. The shaft 10 is mounted on a frame of the machine (not shown) for turning motion about a vertically-extending longitudinal axis thereof. A lower end of the shaft 10 is splined to make a driving connection with a member 11 in a recess of which the lower end of the shaft 10 is received. The member 11 has an arm 12 projecting horizontally therefrom on which arm a link (not shown) is journalled. This link is connected to driving means operable to cause the member 11 and thus the shaft 10 to turn back and forth about the longitudinal axis of the shaft 10. An arm (not shown) projects horizontally from an upper end portion of the shaft 10 and is connected by a link (not shown) in conventional manner to a portion of a mould of the machine. The arrangement is such that, when the shaft 10 is turned about its longitudinal axis, the mould portion is caused to pivot about a further vertical axis to move between a mould open position thereof and a mould closed position thereof in which it co-operates with further mould portions to create a mould cavity in which glass may be formed. The above-described mechanism is conventional on glassware forming machines of the individual section type.

The member 11 has a sleeve 14 fixed thereon which supports a spur gear 16 which is arranged to turn with the shaft 10. The sleeve 14 turns in bearings 18 which are housed in a housing 20 which is fixedly mounted on the machine. The housing 20 is prevented from turning with the shaft 10 by a pin 21 which extends into a recess thereof, the pin 21 being fixedly mounted on the frame of the machine.

Within the housing 20, the spur gear 16 has a toothed surface 22 which is arcuate about the longitudinal axis of the shaft 10 (see FIG. 2). The teeth of the surface 22 are meshed with a gear 24 which is clamped by a clamp 26 to a shaft 28 of a photo-electric encoder 30 which is fixedly mounted on the housing 20. The arrangement is such that, when the shaft 10 is turned to move the mould portion between its mould open and its mould closed positions, the spur gear 16 causes the gear 24 and therefore the shaft 28 of the encoder 30 to turn. Motion of the shaft 10 in the opposite direction causes turning motion of the shaft 28 in the opposite direction also. The encoder 30 is a Muirhead Vactric and forms pulse producing means of the illustrative apparatus associated with a portion of the mould which is moved in the closing action of the mould, and is operative to produce a plurality of pulses during the movement of the associated mould portion, the number of pulses being directly proportional to the distance moved by the mould portion. The movements of the mould portion and of the encoder 30 are both derived from turning of the shaft 10 about its longitudinal axis and the number of pulses produced by the encoder 30 is therefore directly proportional to the movement of the mould portion. The encoder 30 has a first channel 30a (see FIG. 3) on which it produces a position signal each time the shaft 28 thereof reaches a fixed position corresponding to a fixed position of the mould portion. The fixed position is between the mould open and mould closed positions of the mould portion and represents a position through which the mould portion passes during the closing action of the mould which serves as a datum for the counting of pulses produced by the encoder 30 in a closing action of the mould.

As shown in FIG. 3, the first channel 30a of the encoder 30 is connected to a control flip flop 32, to a look-on generator 34, to an inhibit counter 36, and to an inhibit counter 38. The control flip flop 32 has two outputs 32a and 32b, the output 32a being connected to two NAND gates 40 and 42 and the output 32b being connected to two NAND gates 44 and 46. The NAND gates 40 and 44 have second inputs which are connected to the first channel 30a of the encoder 30 and outputs which are connected respectively to clearing inputs of a memory 48 and a memory 50 of the illustrative apparatus. Thus, the production of a position signal on the output 30a of the encoder 30 which occurs during the closing action of the mould when the mould portion reaches the fixed position aforementioned, is effective to operate the control flip flop 32 to change the output thereof between the outputs 32a and 32b, to cause whichever of the NAND gates 40 and 44 is connected to a signal-carrying output of the flip flop 32 to clear its respective memory 48 or 50, to operate the look-on generator 34, and to operate the inhibit counters 36 and 38.

The second channel 30b of the encoder 30 carries the pulses produced by the encoder representative of movement of the mould portion. The channel 30b is connected to a counting pulse interface 52 and also to the look-on generator 34. The look-on generator 34 operates the counting pulse interface 52 to enable the interface 52 to pass pulses for an interval in each cycle of operation of the machine. This interval is determined by the time between the mould portion passing the fixed portion in a closing action of the mould and arriving in a mould closed position. The look-on generator receives the position signal from the channel 30a indicating that the aforementioned interval should start and then switches on the interface 52. The look-on generator 34 also receives the pulses on the channel 30b and detects an absence of such pulses for a predetermined small time interval, indicating that the mould portion has reached its closed position and therefore no pulses are being produced by the encoder 30, and then switches off the interface 52.

The counting pulse interface 52 is connected to the remaining inputs of the NAND gates 42 and 46 aforementioned. The outputs of these NAND gates 42 and 46 are connected to the memories 48 and 50 respectively so that whichever of the NAND gates 42 and 46 is not receiving a signal from the flip flop 32 acts to pass the pulses received from the interface 52 to its associated memory 48 or 50. When the look-on generator 34 detects an absence of pulses on the channel 30b it switches off the interface 52 and pulses cease to enter the memory 48 or 50.

The memories 48 and 50 provides storage means of the illustrative apparatus operative to store the number of pulses produced by the encoder 30 as the mould portion is moved from the fixed position to the mould closed position thereof in a closing action of the mould. The storage means is also operative to store a number of pulses equal to the greatest number of pulses produced by the encoder 30 in previous cycles of operation of the machine during the corresponding movement of the mould portion. The memory 48 provides a first memory arranged to store the number of pulses produced by the encoder 30 in alternate closing actions of the mould and the memory 50 provides a second memory arranged to store the number of pulses produced in the intervening closing actions of the mould. The two memories 48 and 50 are each connected to a comparator 54 which has two outputs which are connected to an oscillator 56 which has outputs connected to an NAND gate 57 whose output is connected to a tolerance counter 58. One of the outputs of the oscillator 56 is also connected to the memory 48 and the other output thereof is also connected to the memory 50. The tolerance counter 58 also has an output which is connected to the oscillator 56. The comparator 54, the oscillator 56 and the tolerance counter 58 together provide comparing means of the illustrative apparatus operative, in each cycle of operation of the machine after the closing action of the mould, to compare the two numbers stored by the storage means and to produce a stop signal in the event that the numbers differ by more than a predetermined number, the stop signal being effective to prevent further closing actions of the mould.

The operation of the comparing means of the illustrative apparatus will now be described in detail. When the mould portion has reached its closed position in a closing action of the mould and both the memories 48 and 50 are storing a number of pulses, the comparator 54 receives the numbers stored by the memories 48 and 50 and compares them to determine whether one number is greater than the other. If the number stored by the memory 48 is greater than that stored by the memory 50, the comparator 54 sends a signal to the oscillator 56 on an output 54a thereof and if the number stored by the memory 50 is greater than that stored by the memory 48 it sends a signal to the oscillator 56 on an output 54b. If the oscillator 56 receives a signal from the oscillator 54, it begins to produce pulses on one of its outputs depending upon on which of the outputs 54a and 54b the comparator 54 produced its signal. If the signal was on the output 54a indicating that the memory 50 has the lower number stored therein, the oscillator 56 produces pulses on the output thereof which is connected to the memory 50 and to the NAND gate 57. Each pulse received by the memory 50 is added to the number stored therein until the comparator 54 detects that the number stored in the memory 50 has reached that stored in the memory 48 whereupon the signal is removed from the output 54a and the oscillator 56 ceases to produce pulses. Meanwhile the tolerance counter 58 is receiving pulses produced by the oscillator 56 via the NAND gate 57 and counts these pulses to ascertain whether the number of pulses produced by the oscillator 56 reaches a predetermined number. This number is predetermined as a tolerance within which the closing action of the mould must operate and, if the predetermined number is reached, it indicates that the mould has not closed correctly. If the memory 50 had contained a greater number than the memory 48 the operation of the oscillator 56 would have been to produce pulses on its other output which is connected to the memory 48 so that the pulses would have been added to the number in the memory 48 but the pulses are also received by the tolerance counter 58 via the NAND gate 57. If the tolerance counter 58 detects that the predetermined number has been reached, it produces an output to the oscillator 56 which switches the oscillator 56 off and also an output to a flip flop 60 whose output 60a provides a stop signal which stops the closing action of the mould from taking place until a reset button 64 is pressed by an operator of the machine. Thus, the comparing means is operative, in each cycle of operation of the machine, to produce pulses and to supply them to which ever memory 48 or 50 is storing the lower number so that the pulses supplied are added to the number stored in that memory until the number stored in each memory is equal and to produce a stop signal if the number of pulses it produces reaches the predetermined number.

The aforementioned output 60a of the output flip flop 60 of the tolerance counter 58 leads to a main control system of the glassware forming machine and such signal is effective to stop the portion of the machine's operation which relates to the closing of the mould. This does not necessarily mean that the machine ceases operation instantly since it may be necessary to clear a mould at the other station of the machine before stopping the machine entirely. In this context the term machine is used in relation to a single section of an individual section machine and stopping of one of the sections does not necessarily involve stopping the remainder of the sections.

The output of the tolerance counter 58 which is connected to the flip flop 60 is also connected to an inhibiting flip flop 62. The flip flop 62 has an output which is connected to the control flip flop 32 and, when a signal is sent from the flip flop 62 to the flip flop 32 the flip flop 32 is prevented from operating. The inhibiting flip flop 62 is cleared through an input which is connected to an NAND gate 66.

The illustrative apparatus also comprises a start button which is used by an operator of the machine to cause the machine to start up again after it has been stopped by a signal on the output 60a of the output flip flop 60. The button 64 is connected to the output flip flop 60 and also to the inhibit counter 38. The inhibit counter 38 has an output which is connected to the NAND gate 66. When the button 64 is pressed by an operator, a signal is sent to the flip flop 60 removing the signal from the output 60a thereof and allowing the machine to re-commence operation. The signal is also sent to the inhibit counter 38 and causes it to operate. Operation of the inhibit counter 38 causes it to wait until it has received two position signals from the channel 30a of the encoder 30 and then to send a signal to the NAND gate 66 which passes a signal to the flip flop 62 thereby removing its output from the flip flop 32. Thus, the comparing means of the illustrative apparatus is operative, in the event that the numbers stored by the memories 48 and 50 differ by more than the predetermined number, to produce an inhibiting signal to the flip flop 62 which is effective to prevent the next position signal received by the flip flop 32 from being effective to change the output of the flip flop between the outputs 32a and 32b. This arrangement is to ensure that in the event of the machine being stopped because of a malfunction, the incorrect number of pulses stored in one of the memories 48 and 50 is not used for comparison purposes in the next cycle of operation of the machine but is instead replaced by the next valid reading.

The illustrative apparatus also comprises inhibiting means operative, on receipt of an operator initiated load memory signal on a button 68, to prevent the comparing means from operating from one cycle of operation of the machine. This arrangement is to enable the machine to commence operations when neither of the memories 48 and 50 contain a number of pulses. The inhibiting means is provided by the inhibit counter 36 which is connected to the load memory button 68 by a connection which is also connected to the NAND gate 66. The inhibit counter 36 is also connected to the oscillator 56. The inhibit counter 36 operates on receipt of a signal from the button 68 to prevent the oscillating means from operating until the inhibit counter 36 has received two position signals from the channel 30a of the encoder 30.

The operation of the illustrative apparatus will now be described. Assuming that neither of the memories 48 and 50 contains a number of pulses and that the output of the flip flop 32 is on the output 32a thereof, an operator of the machine presses the button 68. This causes the inhibit counter 36 to prevent operation of the oscillator 56 and the NAND gate 66 to pass a signal to the flip flop 62 which then clears the flip flop 32 for normal operation. In the first cycle of operation of the machine, as the mould portion moves through its fixed position in the closing action of the mould a signal is produced on the output 30a of the encoder this causes the signal on the output of the flip flop 32 to be transferred to the output 32b and the look-on generator to commence operation. The signal also causes the inhibiting counters 36 and 38 to count one cycle of operation of the machine. The look-on generator 34 causes the interface 52 to pass pulses on to its output from the channel 30b. These pulses are delivered to the NAND gates 42 and 46 but as there is a signal on the output 32B of the flip flop 32 leading to the NAND gate 46 the NAND gate 46 does not pass its pulses to the memory 50. However, the pulses are passed by the NAND gate 42 to the memory 48. When the look-on generator 34 detects an absence of pulses on the channel 30b, indicating that the mould portion is in its mould closed position, the look-on generator 34 switches off the interface 52. The comparator 54 detects that the memory 48 contains more pulses than the memory 50 (which is empty) but the oscillator 56 does not produce pulses because it is inhibited by a signal from the inhibiting counter 36. In the next cycle of operation of the machine, the pulses are delivered to the memory 50 instead of the memory 48, since the next position signal on the channel 30a causes the flip flop 32 to change its output back to the output 32a. The second position signal received thereby also switches off the inhibiting counter 36 so that the oscillator 56 is free to operate. Thus, if the comparator 54 indicates that either of the memories contains less pulses than the other, the oscillator 56 produces sufficient pulses to bring the two memories to the same number and the tolerance counter checks whether this number of pulses exceeds the predetermined number. For example the number of pulses made between passing the fixed position and the mould closed position may be of the order of 480 and the predetermined number of the tolerance counter 58 may be 5. So long as the predetermined number is not exceeded, the tolerance counter 58 produces no output and the machine continues to operate with the largest number of pulses recorded recorded in one of the memories and the most recent number of pulses recorded recorded in the other memory. It should be noted that the position signal on the channel 30a is also effective via the NAND gate 40 or the NAND gate 44 to clear the memory which is to receive the number of pulses during that cycle. In the event of a malfunction causing a stop signal 60a to be produced, the operation of the machine is restarted by pressing the button 64 which causes the flip flop 60 to be reset and the inhibit counter 38 to operate so that the flip flop 32 is not reset for the next cycle. This means that the number of pulses in the first cycle after the stop will be supplied to the same memory as in the cycle which caused the stop so that the incorrect number of pulses stored during that cycle is not used for comparison purposes. Thus the button 64 provides an operator-actuatable re-set control operable, after a stop signal has been produced, to prevent the comparing means from using the number of pulses stored in the cycle during which the stop signal was produced for a comparison, the number stored in the previous cycle being used instead.

We claim:

1. Apparatus for monitoring the closing action of a mould in a glassware forming machine of the type in which the mould undergoes cyclic motion between open and closed positions, comprising:

pulse producing means associated with a portion of the mould which is moved in the closing action of the mould, for producing a plurality of pulses in response to the movement of said mould portion, the number of such pulses being essentially representative of the distance moved by said mould portion;

storage means for storing the number of pulses produced by said pulse producing means during each cycle as the mould portion is moved from a fixed position to mould closed position, and for storing a number of pulses equal to the greatest number of pulses produced by the pulse producing means in previous cycles of operation;

comparing means for comparing in each cycle of operation of the machine after the closing action of the mould, the two numbers stored by the storage means, and for producing a stop signal in the event that the numbers differ by more than a predetermined number, wherein said stop signal is effective to prevent further closing actions of the mould; and inhibiting means operative on receipt of an operator-initiated load memory signal to prevent the comparing means from operating for one cycle of operation of the machine.

2. Apparatus according to claim 1, wherein the storage means comprises a first memory arranged to store the number of pulses produced by the pulse producing means in alternate closing actions of the mould and a second memory arranged to store the number of pulses produced in the intervening closing actions of the mould, and the comparing means is operative, in each cycle of operation of the machine, to produce pulses and to supply them to whichever memory is storing the lower number so that the pulses supplied are added to the number stored in that memory until the number stored in each memory is equal and to produce a stop signal if the number of pulses it produces reaches the predetermined number.

3. Apparatus according to claim 2, wherein the pulse producing means is operative to produce a position signal when the mould portion associated therewith reaches the aforementioned fixed position in a closing action of the mould, the position signal being effective to disconnect one of the two memories from the pulses produced by the pulse producing means and to connect the other memory thereto.

4. Apparatus according to claim 3, wherein the comparing means is operative, in the event that the numbers differ by more than the predetermined number, to produce an inhibiting signal which is effective to prevent the next position signal from being effective as aforesaid.

5. Apparatus according to claim 1, wherein the apparatus comprises an operator-actuactable re-set control operable, after a stop signal has been produced, to prevent the comparing means from using the number of pulses stored in the cycle during which the stop signal was produced for a comparison.

6. Apparatus according to claim 1 wherein the pulse providing means comprises a shaft encoder for producing a pulse train representative of the angular rotation of a shaft which is rotated around a longitudinal axis to move the mould portion.

7. Apparatus as defined in claim 6 wherein the shaft encoder is a photoelectric encoder.

8. Apparatus as defined in claim 1 further comprises means for producing a mould closed signal signifying the termination of the pulse production for a given mould closing cycle when said pulse producing means fails to produce a pulse for more than a predetermined time interval.

9. Apparatus for monitoring the closing action of a mould in a glassware forming machine of the type in which the mould undergoes cyclic motion between open and closed positions, comprising:

pulse producing means associated with a portion of the mould which is moved in the closing action of the mould, for producing a plurality of pulses in response to the movement of said mould portion, the number of such pulses being essentially representative of the distance moved by said mould portion;

storage means for storing the number of pulses produced by said pulse producing means during each cycle as the mould portion is moved from a fixed position to mould closed position, and for storing a number of pulses equal to the greatest number of pulses produced by the pulse producing means in previous cycles of operation;

comparing means for comparing in each cycle of operation of the machine after the closing action of the mould, the two numbers stored by the storage means, and for producing a stop signal in the event that the numbers differ by more than a predetermined number, wherein said stop signal is effective to prevent further closing actions of the mould; and operator-actuactuable re-set control operable, after a stop signal has been produced, to prevent the comparing means from using the number of pulses stored in the cycle during which the stop signal was produced for a comparison.

10. Apparatus according to claim 9, wherein the pulse producing means is operative to produce a position signal when the mould portion associated therewith reaches the aforementioned fixed position in a closing action of the mould, the position signal being effective to disconnect one of the two memories from the pulses produced by the pulse producing means and to connect the other memory thereto.

11. Apparatus according to claim 10, wherein the comparing means is operative, in the event that the numbers differ by more than the predetermined number, to produce an inhibiting signal which is effective to prevent the next position signal from being effective as aforesaid.

12. Apparatus according to claim 9, wherein the pulse producing means comprising a photo-electric encoder driven by a shaft which is turned about a longitudinal axis thereof to move the mould portion in a closing action of the mould.

* * * * *